(12) United States Patent
Bai et al.

(10) Patent No.: US 10,687,290 B2
(45) Date of Patent: Jun. 16, 2020

(54) METHOD TO RECEIVE MULTIPLE SIGNALS USING MULTIPLE BEAMS

(71) Applicant: QUALCOMM Incorporated, San Diego, CA (US)

(72) Inventors: Tianyang Bai, Bridgewater, NJ (US); Muhammad Nazmul Islam, Edison, NJ (US); Juergen Cezanne, Ocean Township, NJ (US); Sundar Subramanian, San Diego, CA (US); Ruhua He, San Diego, CA (US); Raghu Narayan Challa, San Diego, CA (US); Alexei Yurievitch Gorokhov, San Diego, CA (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 13 days.

(21) Appl. No.: 15/961,183

(22) Filed: Apr. 24, 2018

(65) Prior Publication Data
US 2018/0368086 A1  Dec. 20, 2018

Related U.S. Application Data

(60) Provisional application No. 62/520,041, filed on Jun. 15, 2017.

(51) Int. Cl.
*H04J 3/06* (2006.01)
*H04W 56/00* (2009.01)
(Continued)

(52) U.S. Cl.
CPC .......... *H04W 56/001* (2013.01); *H04B 7/088* (2013.01); *H04L 5/0091* (2013.01);
(Continued)

(58) Field of Classification Search
CPC ............. H04W 56/001; H04W 72/046; H04W 72/048; H04L 5/0091; H04B 7/088
(Continued)

(56) References Cited

U.S. PATENT DOCUMENTS 9,307,463 B2 * 4/2016 Martin ............. H04W 36/0094
9,497,649 B2 * 11/2016 Seo ................... H04W 36/0088
(Continued)

FOREIGN PATENT DOCUMENTS

| EP | 3340711 A1 * | 6/2018 | ............ H04W 48/10 |
| WO | WO-2017083489 A1 | 5/2017 | |
| WO | WO-2018145083 A1 * | 8/2018 | .......... H04W 56/001 |

OTHER PUBLICATIONS

International Search Report and Written Opinion—PCT/US2018/029430—ISA/EPO—dated Jul. 23, 2018.

*Primary Examiner* — Thai D Hoang
(74) *Attorney, Agent, or Firm* — Patterson + Sheridan, LLP

(57) ABSTRACT

A UE may identify a first indication associated with a first signaling to be received in a time interval and identify a second indication associated with a second signaling to be received in the time interval. The UE may select to receive and receive, in the time interval, at least one of the first signaling or the second signaling based on at least one of the first or second indications. One or more of the first and second indications may be received from a BS or determined by the UE via predefined or other means. A BS may convey indications of the first and/or second signaling. The first and second indications may be transmitted sufficiently before the signaling in an effort to allow the UE to select and tune its receiver beam in the direction of the signaling to be received.

30 Claims, 13 Drawing Sheets

(51) Int. Cl.
 *H04W 72/04* (2009.01)
 *H04B 7/08* (2006.01)
 *H04L 5/00* (2006.01)
 *H04B 7/06* (2006.01)

(52) U.S. Cl.
 CPC ....... *H04W 72/046* (2013.01); *H04W 72/048* (2013.01); *H04B 7/0695* (2013.01); *H04L 5/0048* (2013.01)

(58) Field of Classification Search
 USPC .................. 370/350, 503–520; 375/354–376
 See application file for complete search history.

(56) References Cited

U.S. PATENT DOCUMENTS

| | | | |
|---|---|---|---|
| 10,263,733 B2* | 4/2019 | Uchino | H04W 16/32 |
| 2010/0309854 A1 | 12/2010 | Wu et al. | |
| 2014/0293893 A1* | 10/2014 | Papasakellariou | H04W 72/04 370/329 |
| 2015/0043542 A1* | 2/2015 | Hoehne | H04W 72/0406 370/336 |
| 2015/0189574 A1* | 7/2015 | Ng | H04W 24/08 370/252 |
| 2015/0296509 A1* | 10/2015 | Yang | H04B 7/26 370/280 |
| 2018/0091196 A1* | 3/2018 | Frenne | H04B 7/0408 |
| 2018/0098258 A1* | 4/2018 | Annam | H04B 17/24 |
| 2018/0270699 A1* | 9/2018 | Babaei | H04W 28/0278 |
| 2018/0270700 A1* | 9/2018 | Babaei | H04W 28/0278 |
| 2018/0302895 A1* | 10/2018 | Akkarakaran | H04W 72/1268 |
| 2019/0182004 A1* | 6/2019 | Doll | H04L 5/0048 |

\* cited by examiner

METHOD TO RECEIVE MULTIPLE SIGNALS USING MULTIPLE BEAMS

CROSS-REFERENCE TO RELATED APPLICATION

This application claims benefit of priority from commonly-owned U.S. Provisional Application Ser. No. 62/520,041, filed Jun. 15, 2017, which is expressly incorporated herein by reference in its entirety.

INTRODUCTION

Aspects of the present disclosure relate to wireless communications, and more particularly, a user equipment (UE) selecting to receive one or more beamformed signals in a same time interval.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

As described herein, certain wireless systems may employ directional beams for transmission and reception. Based on a UE's capability, such as processing abilities or RF configuration, the UE may not be able to simultaneously receive information from multiple directions in a single time instance. Aspects of the present disclosure provide methods for a UE to select which signaling to receive in a time instance. As described herein, the signaling may be transmitted by a BS and received at a UE via beams.

Certain aspects of the present disclosure provide a method for wireless communication that may be performed, for example, by a UE. The method includes identifying a first indication associated with a first signaling to be received in a time interval, identifying a second indication associated with a second signaling to be received in the time interval, selecting to receive, in the time interval, at least one of the first signaling or the second signaling based on at least one of the first or second indications, and receiving the selected at least one signaling in the time interval.

Certain aspects of the present disclosure provide an apparatus for wireless communication that may be performed, for example, by a UE. The apparatus includes means for identifying a first indication associated with a first signaling to be received in a time interval, means for identifying a second indication associated with a second signaling to be received in the time interval, means for selecting to receive, in the time interval, at least one of the first signaling or the second signaling based on at least one of the first or second indications, and means for receiving the selected at least one signaling in the time interval.

Certain aspects of the present disclosure provide an apparatus for wireless communication that may be performed, for example, by a UE. The apparatus includes at least one processor and a memory coupled to the at least one processor. The at least one processor is configured to identify a first indication associated with a first signaling to be received in a time interval, identify a second indication associated with a second signaling to be received in the time interval, select to receive, in the time interval, at least one of the first signaling or the second signaling based on at least one of the first or second indications, and receive the selected at least one signaling in the time interval.

Certain aspects of the present disclosure provide a computer readable medium storing computer executable code for causing a UE to identify a first indication associated with a first signaling to be received in a time interval, identify a second indication associated with a second signaling to be received in the time interval, select to receive, in the time interval, at least one of the first signaling or the second signaling based on at least one of the first or second indications, and receive the selected at least one signaling in the time interval.

Certain aspects of the present disclosure provide a method for wireless communication performed, for example, by a base station (BS). The method generally includes conveying a first indication associated with a first signaling to be sent to a user equipment (UE) in a time interval, conveying a second indication associated with a second signaling to be sent to the UE in the time interval, selecting to transmit, in the time interval, at least one of the first signaling or the second signaling based on at least one of the first or second indications, and transmitting the selected at least one signaling in the time interval.

Certain aspects of the present disclosure provide an apparatus for wireless communication performed, for example, by a base station (BS). The apparatus generally includes means for conveying a first indication associated with a first signaling to be sent to a user equipment (UE) in a time interval, means for conveying a second indication associated with a second signaling to be sent to the UE in the time interval, means for selecting to transmit, in the time interval, at least one of the first signaling or the second signaling based on at least one of the first or second indications, and means for transmitting the selected at least one signaling in the time interval.

Certain aspects of the present disclosure provide an apparatus for wireless communication performed, for example, by a base station (BS). The apparatus includes at least one processor and a memory coupled to the at least one processor. The at least one processor is configured to convey a first indication associated with a first signaling to be sent to a user equipment (UE) in a time interval, convey a second indication associated with a second signaling to be sent to the UE in the time interval, select to transmit, in the time interval, at least one of the first signaling or the second signaling based on at least one of the first or second indications, and transmit the selected at least one signaling in the time interval.

Certain aspects of the present disclosure provide a computer readable medium storing computer executable code for causing a BS to convey a first indication associated with a first signaling to be sent to a user equipment (UE) in a time interval, convey a second indication associated with a second signaling to be sent to the UE in the time interval, select to transmit, in the time interval, at least one of the first signaling or the second signaling based on at least one of the first or second indications, and transmit the selected at least one signaling in the time interval.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
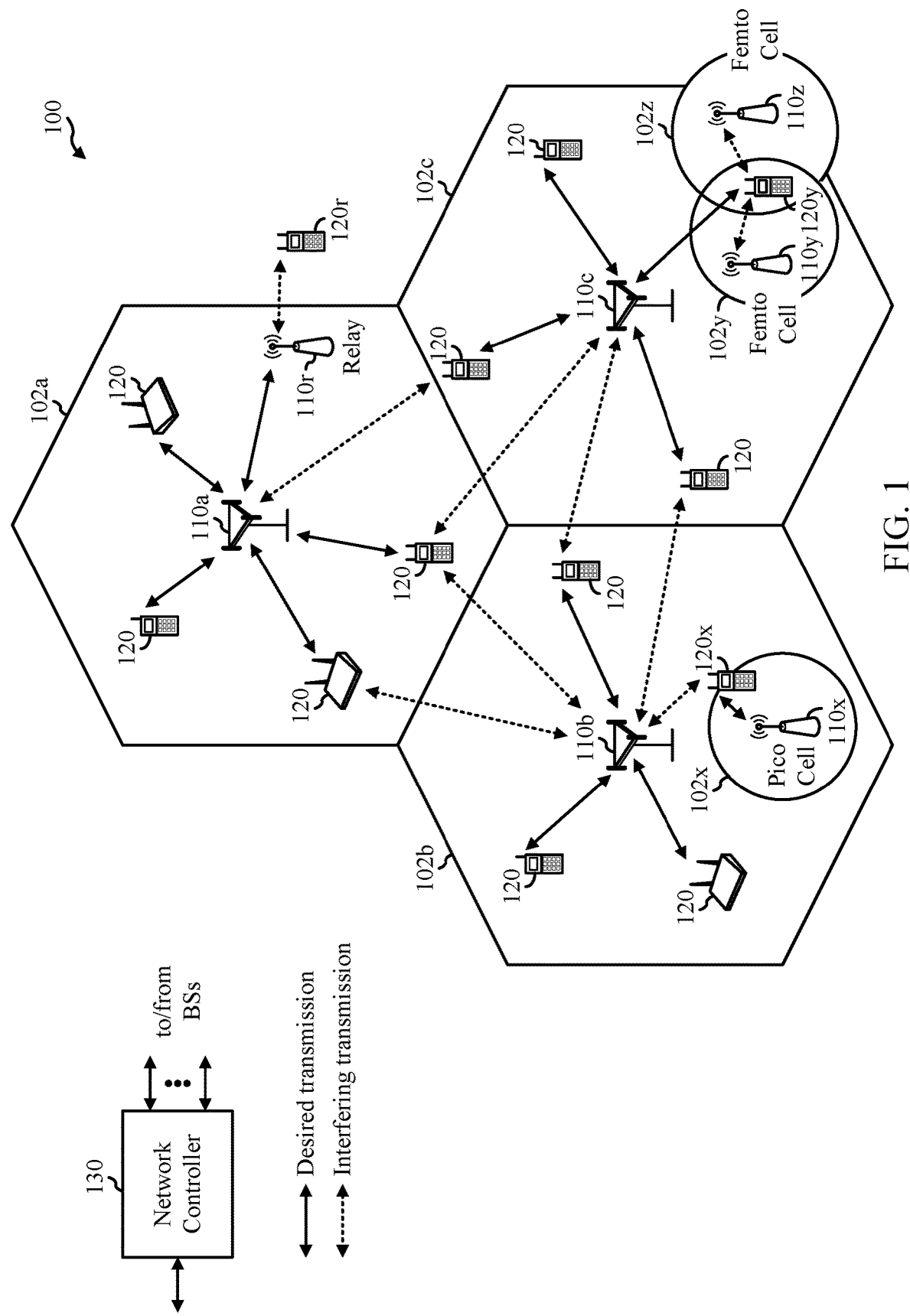
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

mmW communications bring gigabit speeds to cellular networks, due to availability of large amounts of bandwidth. The unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

Spectrum bands in high frequencies (e.g., 28 GHz, may be referred to as mmW (or mmWave)) provide large bandwidths capable of delivering multi-Gbps data rates, as well as extremely dense spatial reuse which may increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmW operate, small wavelengths enable a large number of antenna elements in a relatively small form factor. Unlike microwave links, which may cast very wide footprints, reducing the achievable amount of reuse of the same spectrum within a geographical area, mmW links cast very narrow beams (for example, beams may have a narrow angle). This characteristic of mmW may be leveraged to form directional beams that may send and receive more energy to overcome propagation and path loss challenges.

These narrow directional beams can also be utilized for spatial reuse. This is one of the key enablers for utilizing mmW for mobile broadband services. In addition, the non-line-of-site (NLOS) paths (e.g., reflections from nearby building) can have very large energies, providing alternative paths when line-of-site (LOS) paths are blocked.

With more antenna elements and narrow beams, it becomes increasingly vital to transmit signals in the appropriate direction, in an effort to maximize the received signal energy at the UE.

As will be described in more detail herein, a UE may receive a first indication associated with a first beamformed signaling to be transmitted by a BS in a subsequent time interval. Thereafter, a UE may receive a second indication regarding a second signaling to be transmitted in the same, subsequent time interval. Accordingly, the UE has received signaling for two transmissions it may receive in the same time interval. In an example, the UE may receive both indications from a BS. In another example, one of the indications (e.g., the first indication) is received from a BS and another indication (e.g., the second indication) is received or identified from a predefined method, such as based on indication defined in a standard.

As will be described in more detail herein, because of a UE's capability, the UE may not be able to receive both the first and second signaling in the time interval. Aspects of the present disclosure provide methods for the UE to select to receive at least one signal in a time period, from multiple signals whose transmissions are indicated by a BS to all occur in a same time interval. The UE may select an appropriate receive beam associated with the selected signaling and receive the selected signaling. In an aspect, the UE may determine which signaling it will receive based, at least in part, on the time between transmission of the second indication and when the second signaling is to be received. If the time difference is less than a threshold amount of time, the UE may select to receive (e.g., prepare to receive) the first signaling. In aspects, the UE may receive both the first and second signaling.

According to aspects, a BS may perform corresponding operations. For example, the BS may convey indications of multiple signaling to be received by the UE in a same time interval. A second indication associated with a second signaling may be transmitted after a first indication associated with a first signaling. The second indication may provide an updated configuration (e.g., receiver beam) relative to the first indication. Additionally, the second indication may be transmitted with enough time to allow the UE to receive the second signaling. The BS may determine the likelihood of the UE receiving each of the signals and may transmit the signal the UE is more likely to receive. In an aspect, the time difference between transmission of the second indication and transmission of the time interval in which one or more of the first and second signaling are to be transmitted is greater than or equal to a threshold time value, in an effort to allow the UE sufficient time to update its receiver configuration (e.g., receive beam direction) based on the second indication.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

Figure 8:
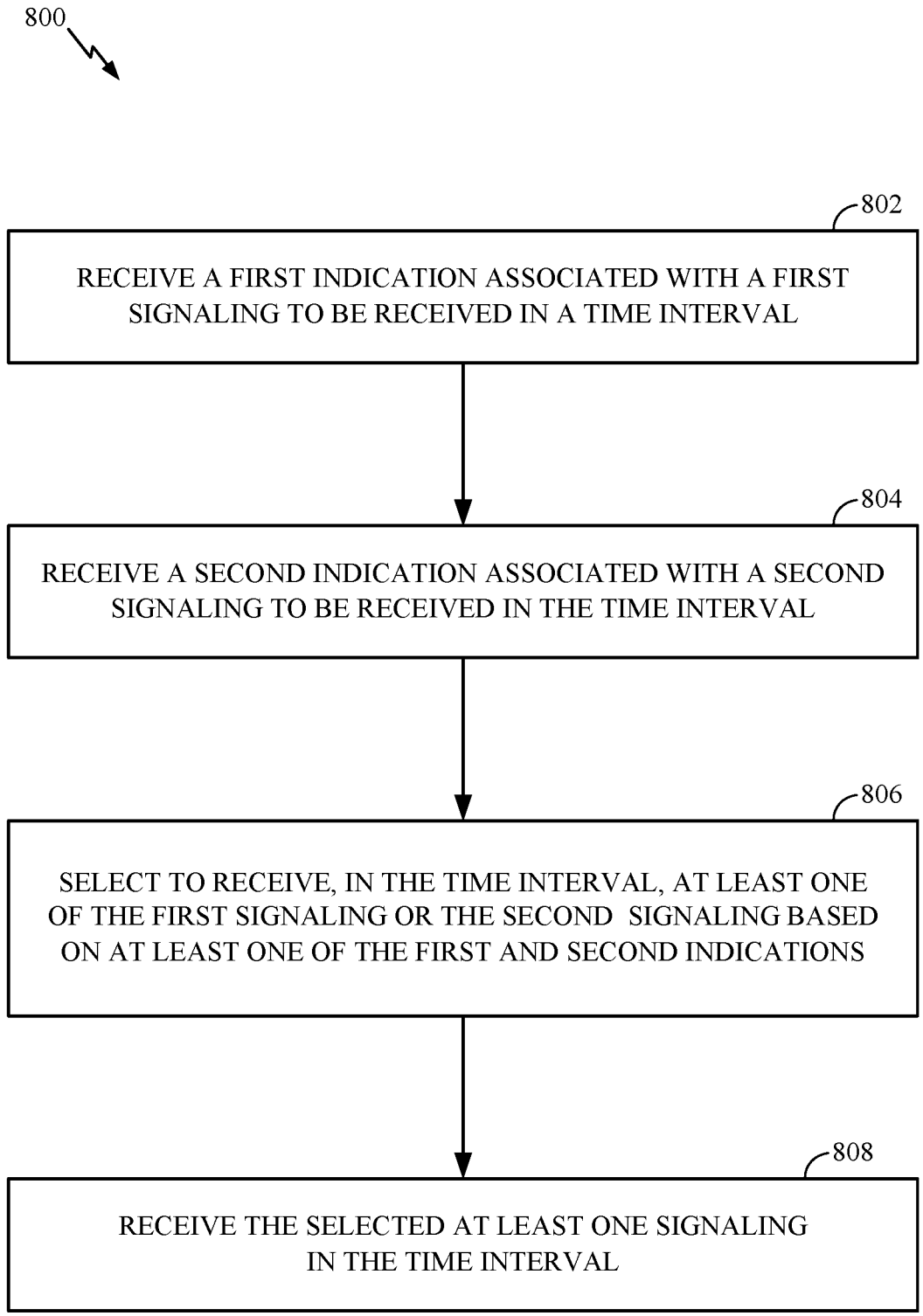
FIG. 8 illustrates example operations performed by a UE, in accordance with certain aspects of the present disclosure.

FIG. 1 illustrates an example wireless network 100 in which aspects of the present disclosure may be performed. According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 8. A receiving entity may use receiver beamforming to receive the transmitted signaling.

In scenarios where the UE may only receive a limited number of directional signals in a time interval, a UE may benefit from a procedure to select to receive at least one of the signals using certain receiver beams in the time interval.

Aspects of the present disclosure provide techniques and apparatus for determining, by a UE, which signaling to receive in a time interval. According to an aspect, a UE may receive a first indication associated with a signaling to be received in a time interval and may subsequently receive a second indication associated with a second signaling to be received in the same time interval. The indications and/or signaling may be transmitted by the same or different BSs. In an aspect, one of the indications may be transmitted by a BS and another indication may be determined or received based on predetermined methods. In an example, one of the indications may be defined by a standard. Based, at least in part, on the UE's configuration, the UE may select at least one of: the first signaling, the second signaling, or a combination thereof to receive in the same time interval. The UE may receive the selected one or more signals in the time interval. As described herein, the UE may receive the first and second signaling with enough time to select and tune its receive beam in the direction of the selected directional beams in the time interval. The first and second signaling may be associated with beam-monitoring for mobility management or data. Mobility management may refer to beam management and/or cell selection.

Correspondingly, a BS may convey the first and/or second indications to the UE. In one example, the BS may transmit the first and the second indications regarding transmissions in a future time interval. The BS may transmit multiple signals in the time interval. For example, the BS may select to transmit signaling associated with the first indication, signaling associated with the second indication, or a combination thereof. As described above, the indications are transmitted with enough time for the UE to select and tune its receive beam in the direction of the signaling it is attempting to receive.

UEs 120 may be configured to perform the operations 800 and methods described herein for selecting one or more signals to receive in a time interval. A UE 120 may be configured to perform the operations described and claimed herein. For example, the UE may be configured to receive from a BS 110 a first indication associated with a first signaling to be received in a time interval and a second indication associated with a second signaling to be received in the same time interval. The UE may select to receive at least one of the first signaling associated with the first indication or the second signaling associated with the second indication in the time interval. The UE may receive the selected one or more signaling in the time interval. The signaling may be received by a UE using receiver beam(s).

BS 110 may comprise a transmission reception point (TRP), Node B (NB), 5G NB, access point (AP), new radio (NR) BS, Master BS, primary BS, etc.). The NR network 100 may include the central unit. The BS 110 may be configured to perform the operations 900 and the methods described herein. A BS 110 may be configured to convey a first indication associated with a first signaling to be sent to a UE in a time interval, convey a second indication associated with a second signaling to be sent to the UE in the time interval, select to transmit, in the time interval, at least one of the first signaling or the second signaling based on at least one of the first or second indications, and transmit the selected at least one signaling in the time interval.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
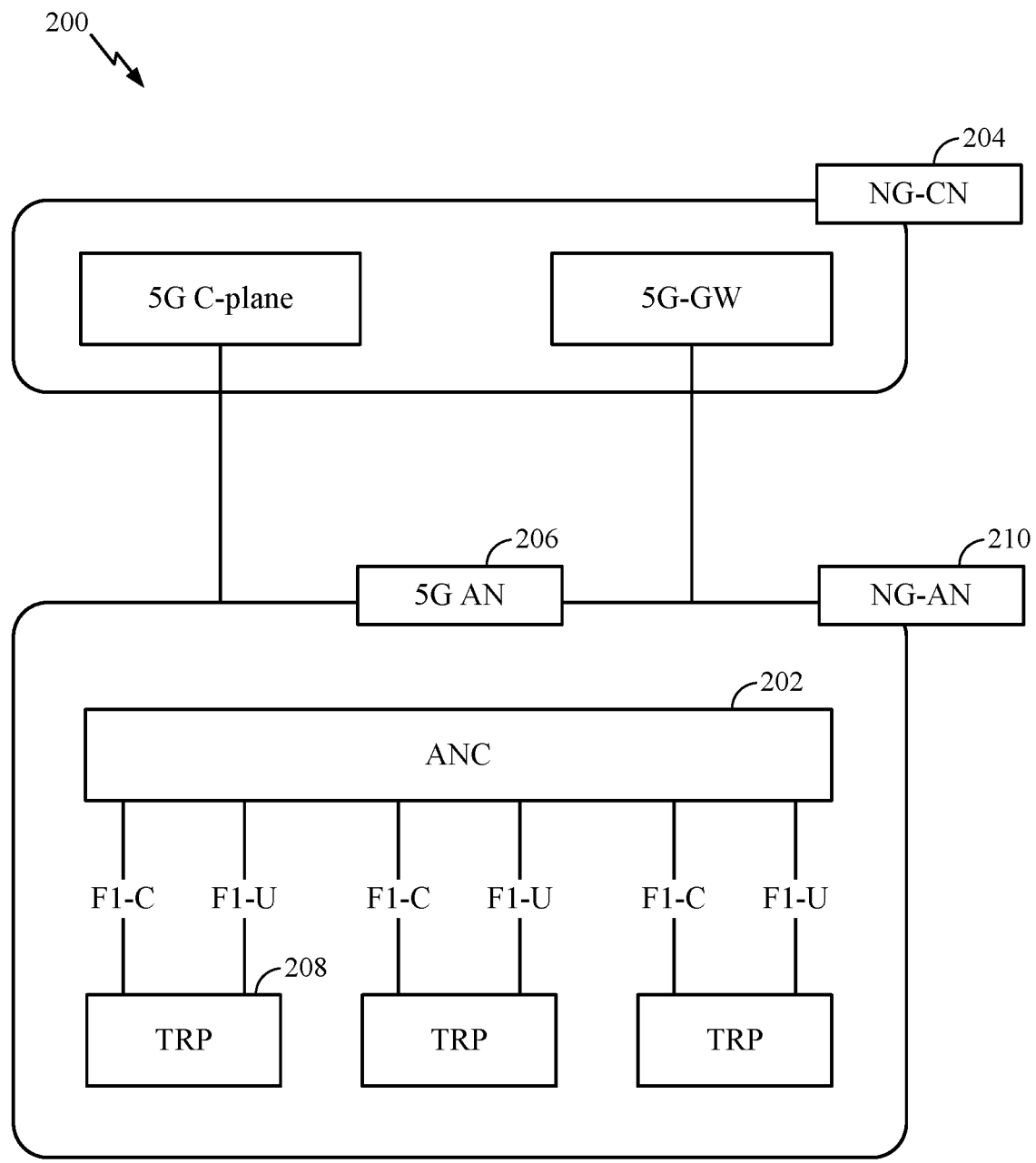
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200.

As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
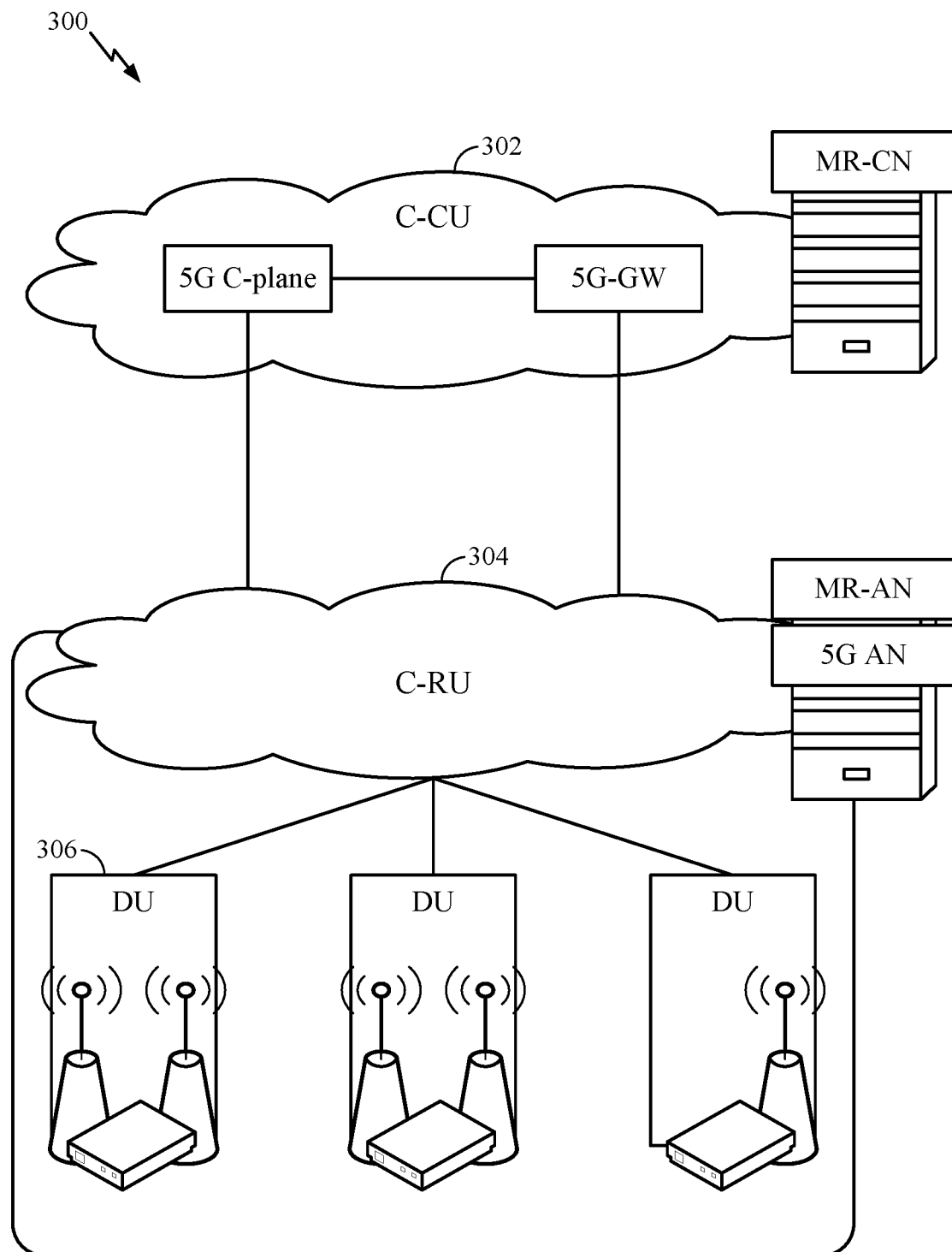
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
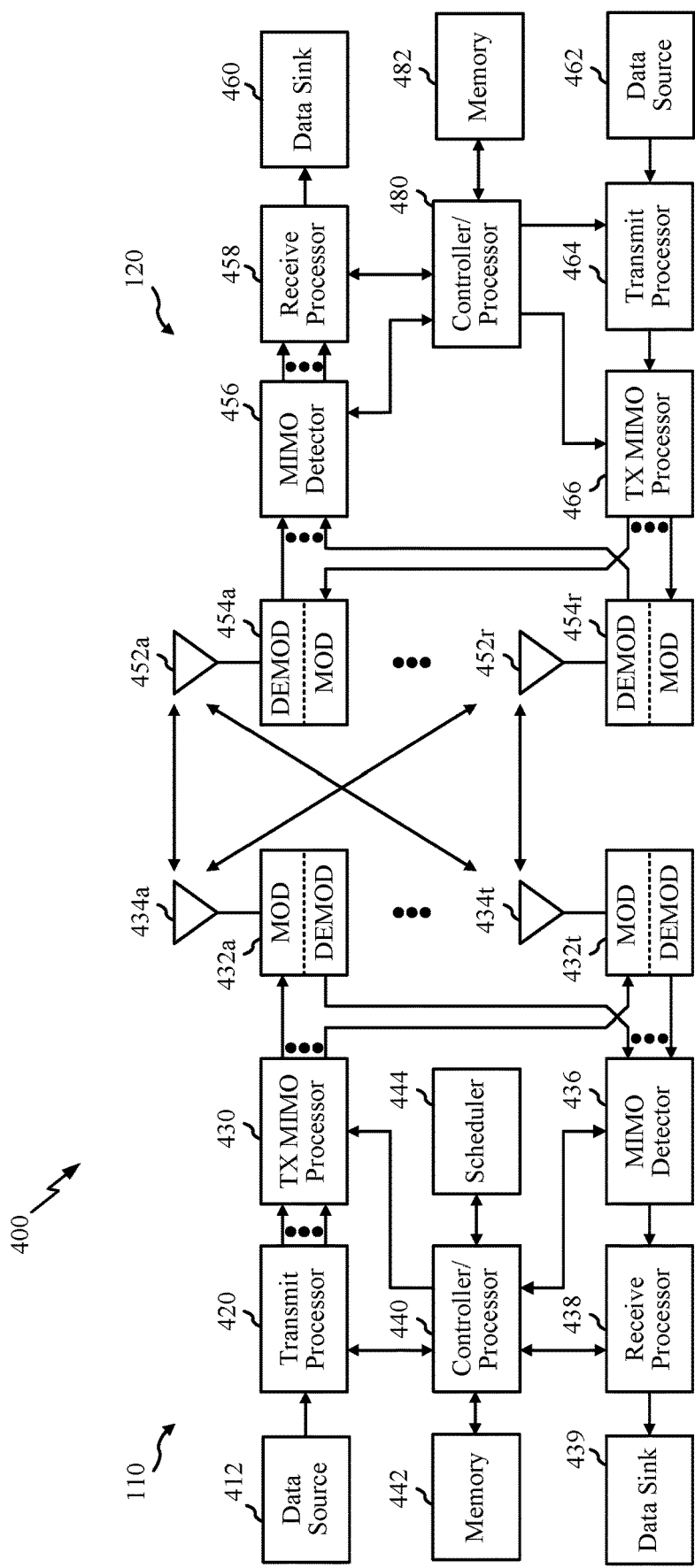
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be used to perform the operations described herein and illustrated with reference to FIG. 8. According to an example, antennas 434, DEMOD/MOD 432, processors 430, 420, 438 and/or controller/processor 440 of the BS 110 may be used to perform the operations described herein and illustrated with reference to FIG. 9.

As an example, one or more of the antennas 452, DEMOD/MOD 454, processors 466, 458, 464, and/or controller/processor 480 of the UE 120 may be configured to perform the operations described herein such as the described receiving, selecting, determining, reporting, and operations for selecting and receiving signaling in a time interval. Similarly, one or more of the 434, DEMOD/MOD 432, processors 430, 420, 438 and/or controller/processor 440 of the BS 110 may be configured to perform the operations described herein such as the described conveying, selecting, transmitting, receiving, sending, and determining.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIG. 8, and/or other processes for the techniques described herein and those illustrated in the appended drawings. The processor 440 and/or other processors and modules at the BS 110 may perform or direct, e.g., the execution of the functional blocks illustrated in FIG. 9, and/or other processes for the techniques described herein and those illustrated in the appended drawings. The memories 442 and 482 may store data and program codes for the BS 110 and the UE 120, respectively.

Figure 5:
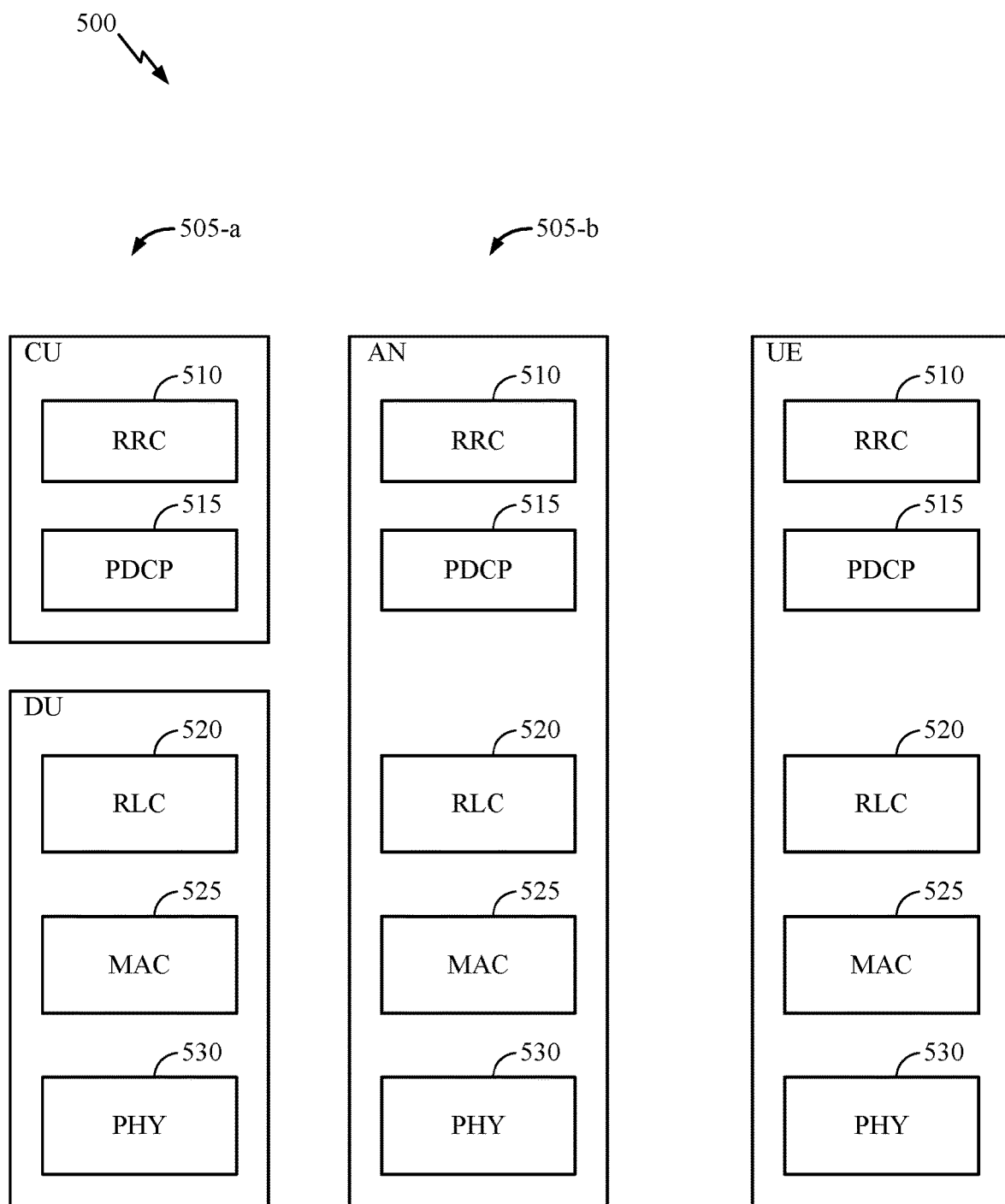
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
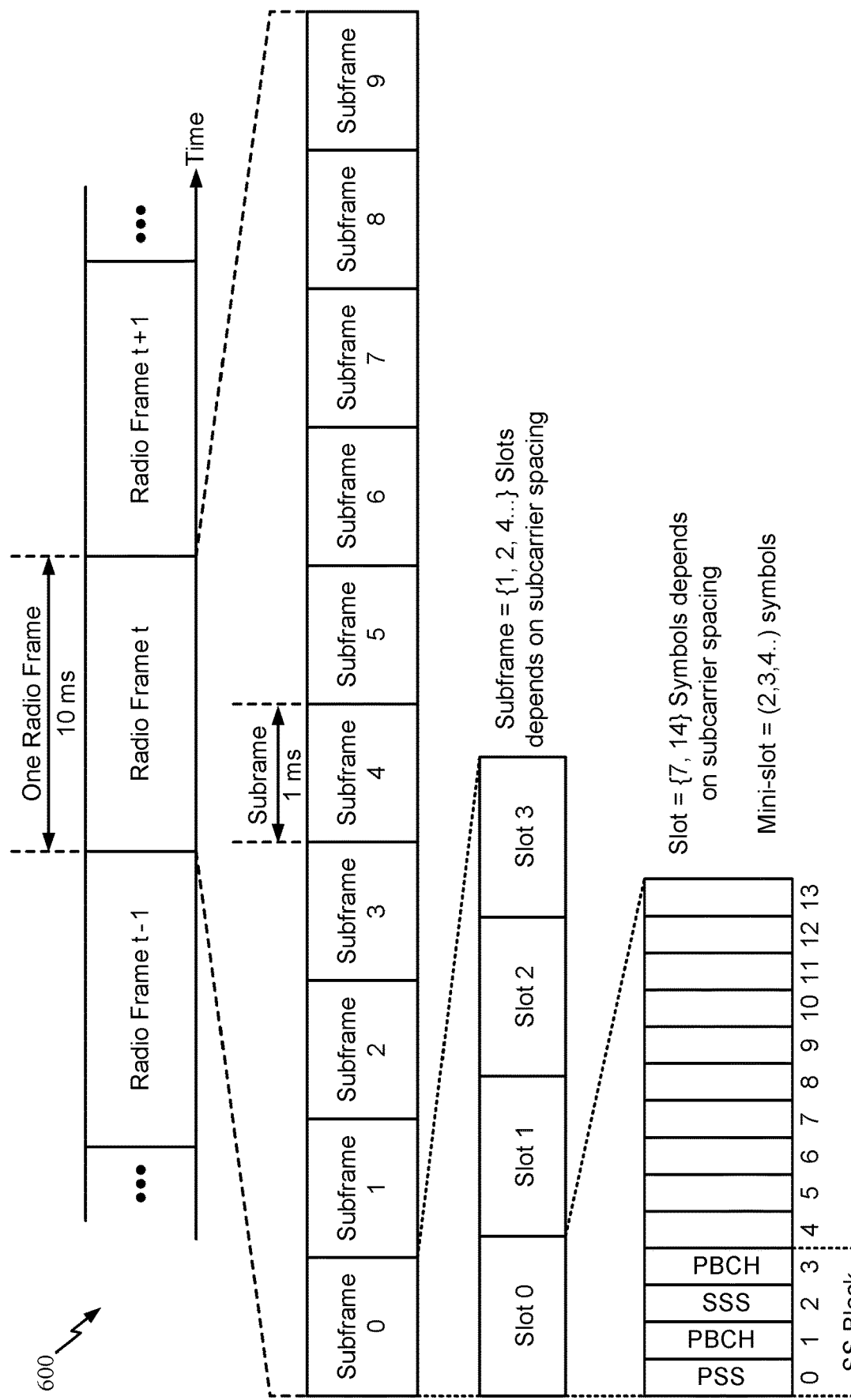
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Method to Receive Multiple Signals Using Multiple Beams

Millimeter wave (mmW) may use beamforming (BF) to meet the link margin. Directional BF may be applied by both a transmitter and a receiver. As described above, BF makes transmission more directional as compared to sub-6 LTE systems. Directionality may cause problems for a receiver to receive signals and/or monitor wireless channels simultaneously from two or more different directions.

Figure 7:
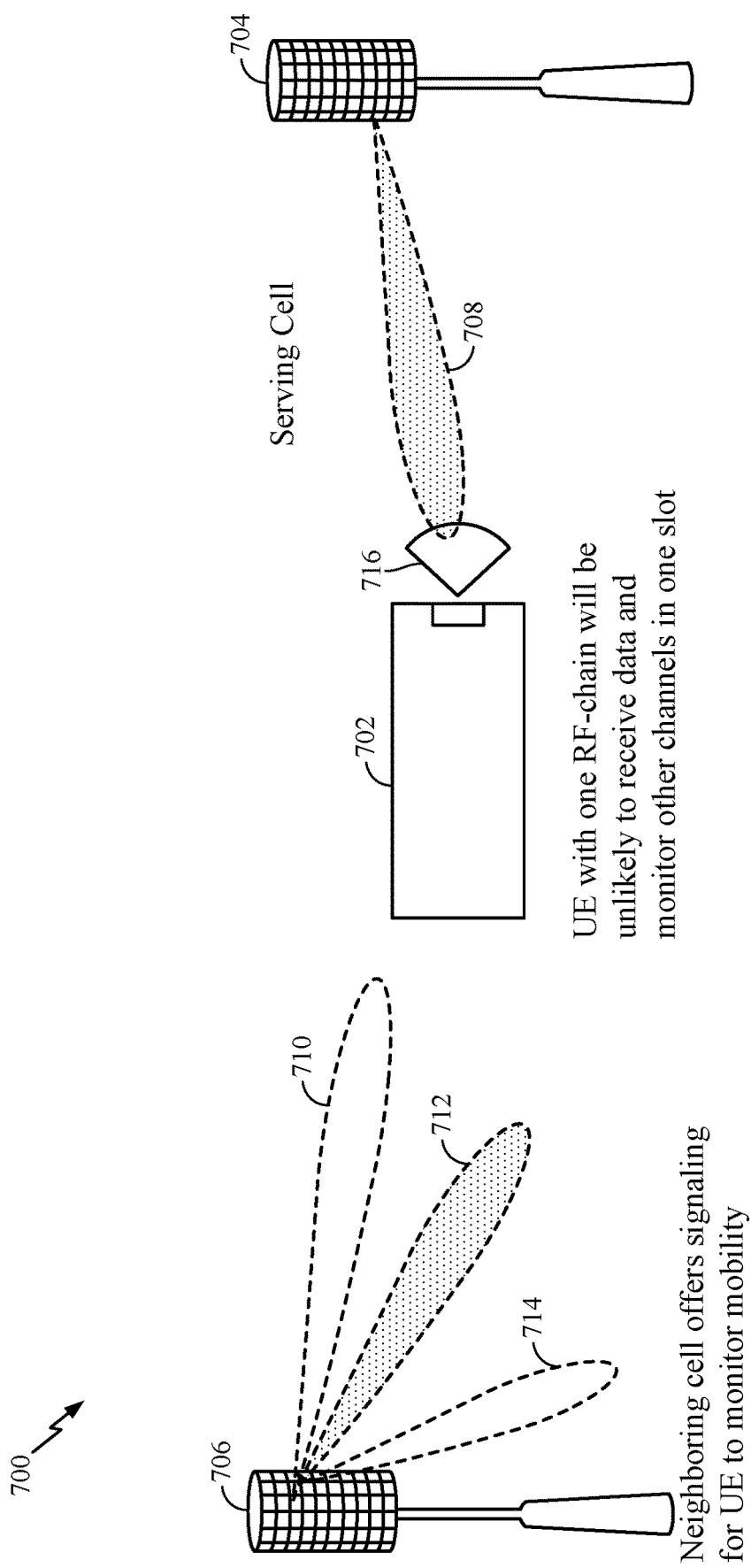
FIG. 7 illustrates an example of a UE which may be unable to receive signaling from multiple directions in a given time interval.

FIG. 7 illustrates an example 700 of a UE 702 that may not be able to receive/monitor multiple, directional beamformed signals simultaneously at a given time. The serving BS 704 and neighboring BS 706 may focus transmission energy in the illustrated narrow directional beams 708-714. The UE 702 may have a single receive RF chain. As such, at any given time, because of the UE's capability, it may only be able to receive signaling via one directional receive beam. Accordingly, the UE may not be able to simultaneously receive data from its serving BS 704 while monitoring one or more beams for mobility management from a neighboring BSs 706. As described herein, mobility management may refer to beam selection by the UE and/or cell (or BS) selection. Because of the UE's capability of being able to monitor a single direction, the UE may not be able to receive both (1) data transmitted via beam 708 and (2) monitor beams from other directions, such as beams 710, 712, and/or 714.

As illustrated, the UE 702 may only receive signaling within a sector 716. The UE may not simultaneously receive signals arriving outside of the sector 716 while receiving signaling within the sector 716. Aspects of the present disclosure provide procedures for a UE to select which direction to monitor when, for example, one or more BSs transmit multiple directional signals associated with different receive beams to be received in a same time interval (time instance, time period, slot transmission time interval (TTI)). Aspects of the present disclosure provide procedures for a BS to transmit a first indication associated with a first signaling to be transmitted in a time interval and a second indication associated with a second signaling to be transmitted in the time interval. According to aspects, the second indication is transmitted with enough time to allow the UE to receive the second signaling. As described herein, the BS may transmit the second indication upon determining that the UE may receive the first signaling with a low probability. According to an example, the BS may transmit the second indication upon determining that the BS may change a configuration associated with the first signaling. In one example, a change in configuration may refer to a change the sweeping direction the UE uses to perform the beam sweep. This change may be based on a change in the transmit beam used by the BS. Due to the change in sweeping direction, the BS may transmit the second indication.

In an example, one indication may be explicitly transmitted by a BS and another indication may be indicated by predefined methods. As an example, the other indication may be defined in a standard. Accordingly, the BS may not transmit both the first and second indications regarding signaling to be received in a same time interval.

FIG. 8 illustrates example operations 800 which may be performed by UE, according to aspects of the present disclosure. The UE may include one or more modules of the UE 120 illustrated in FIG. 4.

At 802, the UE may identify a first indication associated with a first signaling to be received in a time interval. At 804, the UE may identify a second indication associated with a second signaling to be received in the time interval. As described above, the indications may be received from one or more BSs. Alternatively, one indication may be received from a BS and another indication may be defined by a standard.

At 806, the UE may select to receive, in the time interval, at least one of the first signaling or the second signaling based on at least one of the first or second indications. At 808, the UE may receive the selected at least one signaling in the time interval.

Figure 10:
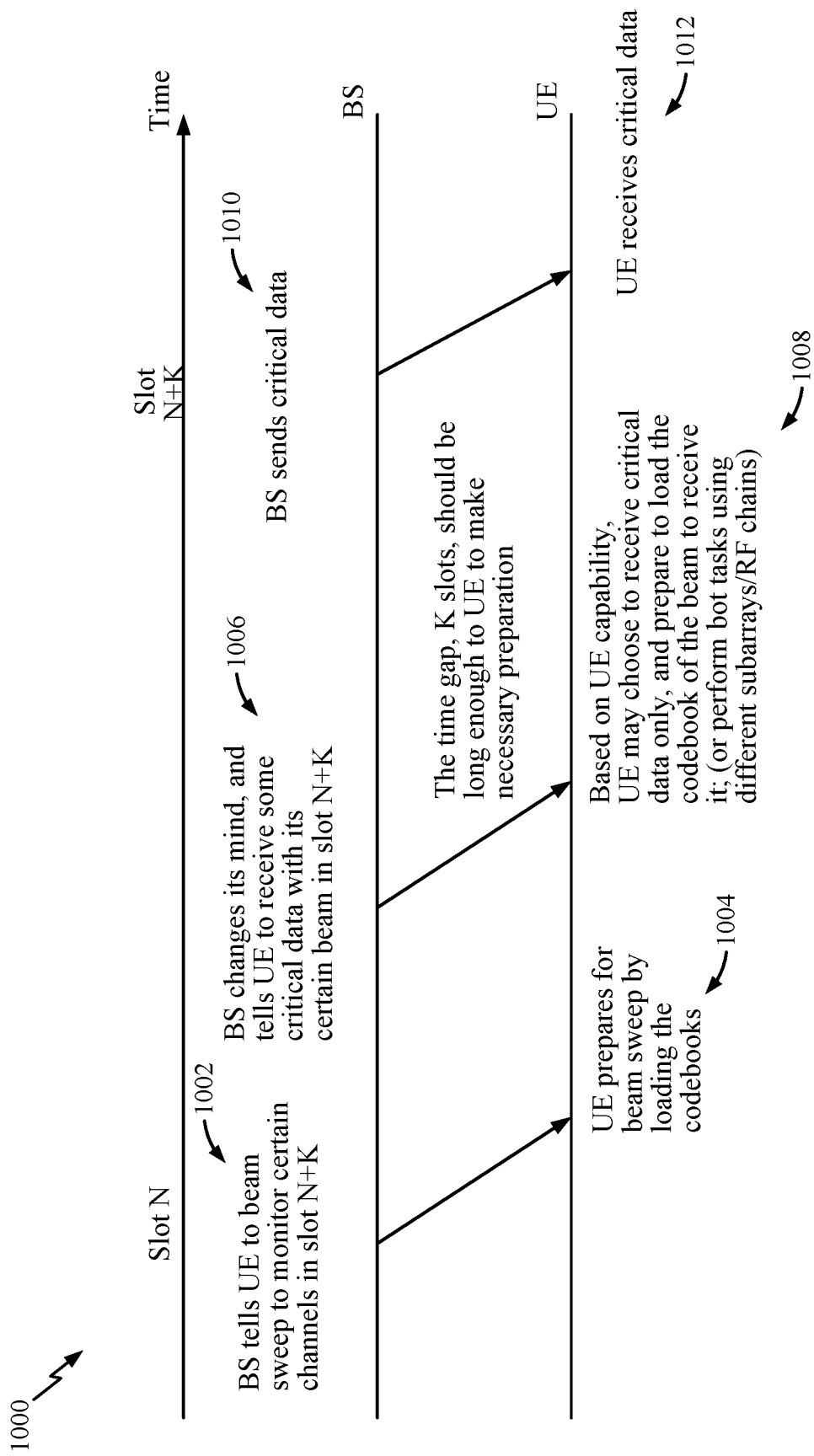
FIG. 10 illustrates an example timeline, in accordance with aspects of the present disclosure.
Figure 11:
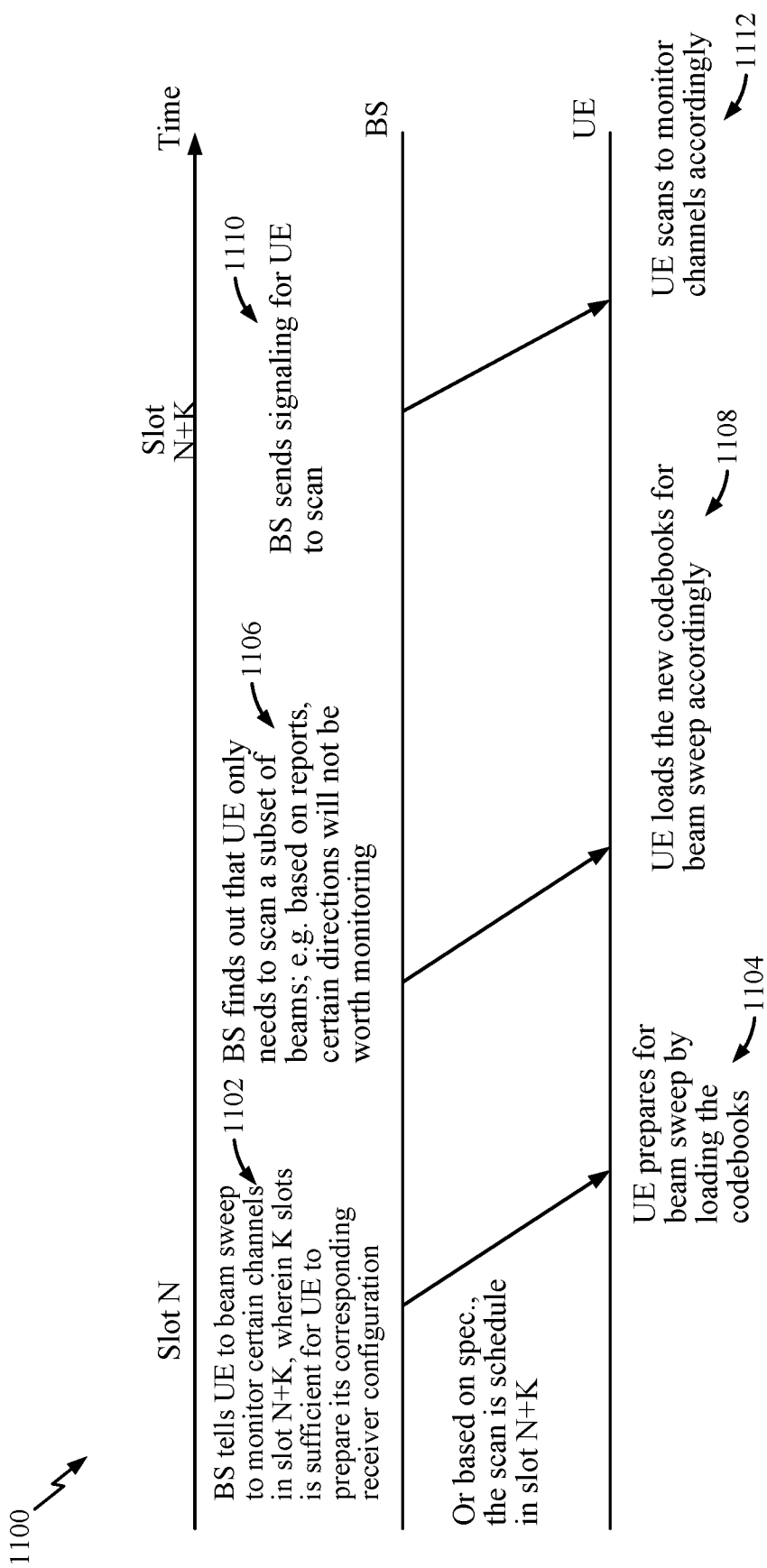
FIG. 11 illustrates an example timeline, in accordance with aspects of the present disclosure.

According to aspects, the first signaling may be received via a first receiver beam and the second signaling may be received via a second receiver beam. The first and second receiver beams may have different directions. The UE may tune its receive beam in the direction of the selected one or more beams. In an example, and as described in more detail herein, and as illustrated in FIGS. 10 and 11, the first and second indications may be transmitted sufficiently in advance of the signaling in the time interval. According to an example, the first and second indications may be transmitted in a time interval preceding the time interval in which the signaling is transmitted. Accordingly, the UE may have enough time to select, prepare, and load the codebook(s) associated with the receive beam to be used to receive the selected signaling.

According to aspects, the UE may receive the first indication (associated with the first signal) explicitly from a BS. According to aspect, the UE may receive the second indication (associated with the second signal) explicitly from the BS. The BS may be a serving or non-serving BS. At least one of the first or second indications may be identified via downlink control information or RRC signaling. Additionally or alternatively, the UE may be preconfigured with procedures to receive or identify the first indication or the second indication. For example, a specification or standard may define the procedures a UE may follow to receive the first indication or the second indication in a certain time interval. According to an example, the UE may use a combination of direct communication with the BS and methods specified in a standard or specification to receive or identify the first or second indication. Therefore, in certain scenarios, one indication may be explicitly received by the UE and another indication may be based on a predefined method such as defined by a standard.

According to aspects, the first signaling may be a synchronization signal or a channel state information-reference signal (CSI-RS). The CSI-RS may be periodic or aperiodic and may be transmitted by a serving or neighboring BS. Regardless of the specific signaling, the first signaling may be used for beam or mobility management. Beam management may refer to selecting a preferred pair of BS transmit and UE receive beam and mobility management may refer to a handover decisions from a serving BS to a neighboring BS.

According to aspects, the UE may report, to a BS (serving or neighboring), capability information associated with the UE. The capability information may indicate a number of RF chains the UE has, a number of directions the UE is able to monitor simultaneously, the minimum time needed between the when the UE receives the second indication and when the UE is expected to receive the second signaling such that the UE may prepare its receiver configuration, and/or the UE's antenna subarray information. Stated otherwise, the capability information may indicate whether or not the UE is capable of receiving multiple signals (channels) in a time interval. In some instances, the UE may receive a request, from the BS, for the UE's capability information. In response, the UE may transmit the report indicating its capability.

According to aspects, the second signaling may include data transmissions. For example, the second signaling may be transmitted on a PDSCH. According to aspects, the second signaling may include any high priority data such as mission critical targeting ultra reliable low latency communications (URLLC). While examples described herein describe the first signaling as including synchronization signaling or CSI-RS and the second signaling as including data, the first and second signaling may include any combination of data and signaling used for beam and/or mobility management.

According to an aspect, the selection of which signal the UE receives is based, at least in part, on a time duration between reception of the second indication and when the second signal is to be received. If the time difference between the second indication and when the UE expects to receive the second signaling is less than a threshold time value K, the UE may select to receive the first signaling. In one example, a time difference less than K may indicate the UE does not have enough time to reconfigure its codebook(s) and/or receiver beam to receive the second signaling. Accordingly, the UE may select to receive the first signaling. A time difference greater than or equal to K, which occurs when the second indication is transmitted (in a time interval) that precedes the time interval in which the signaling is to be transmitted by an amount of time greater than or equal to K, may indicate that the UE has enough time to prepare and receive the second signaling. Accordingly, the UE may choose to receive, at least, the second signaling.

The threshold time time K may be identified by a predefined method (e.g., defined in a standard), may be based on a UE's capability. For example, the standard may define K for a UE based, at least in part, on the UE's capability. In some aspects, the UE may report its K value based on its capability or as defined by a standard to the network.

According to aspects, the UE may select to receive both the first and the second signaling. In some instances, however, the UE may select to receive only one of the first and the second signaling. The UE may transmit an indication, to the BS, regarding the selected received signaling or the selected signaling the UE intends to receive. According to an example, the UE may transmit an indication of regarding the selected signal to be received in the time interval. Accordingly, the BS may be aware of the signaling the UE received or is attempting to receive in the future time interval.

According to aspects, and as will be described, for example, in FIG. 11, the UE may prioritize one signaling over another signaling. For example, the BS may determine that a UE may receive the first signaling with a low probability. Accordingly, the UE may be provisioned to prioritize the second signaling over the first signaling. For example, the second indication associated with the second signaling may be transmitted after the first indication associated with the first signaling. According to aspects, the UE may be configured to prioritize the second indication (later arriving indication) over the first indication. In an example, the second indication may provide an updated beam direction relative to the first indication.

Figure 9:
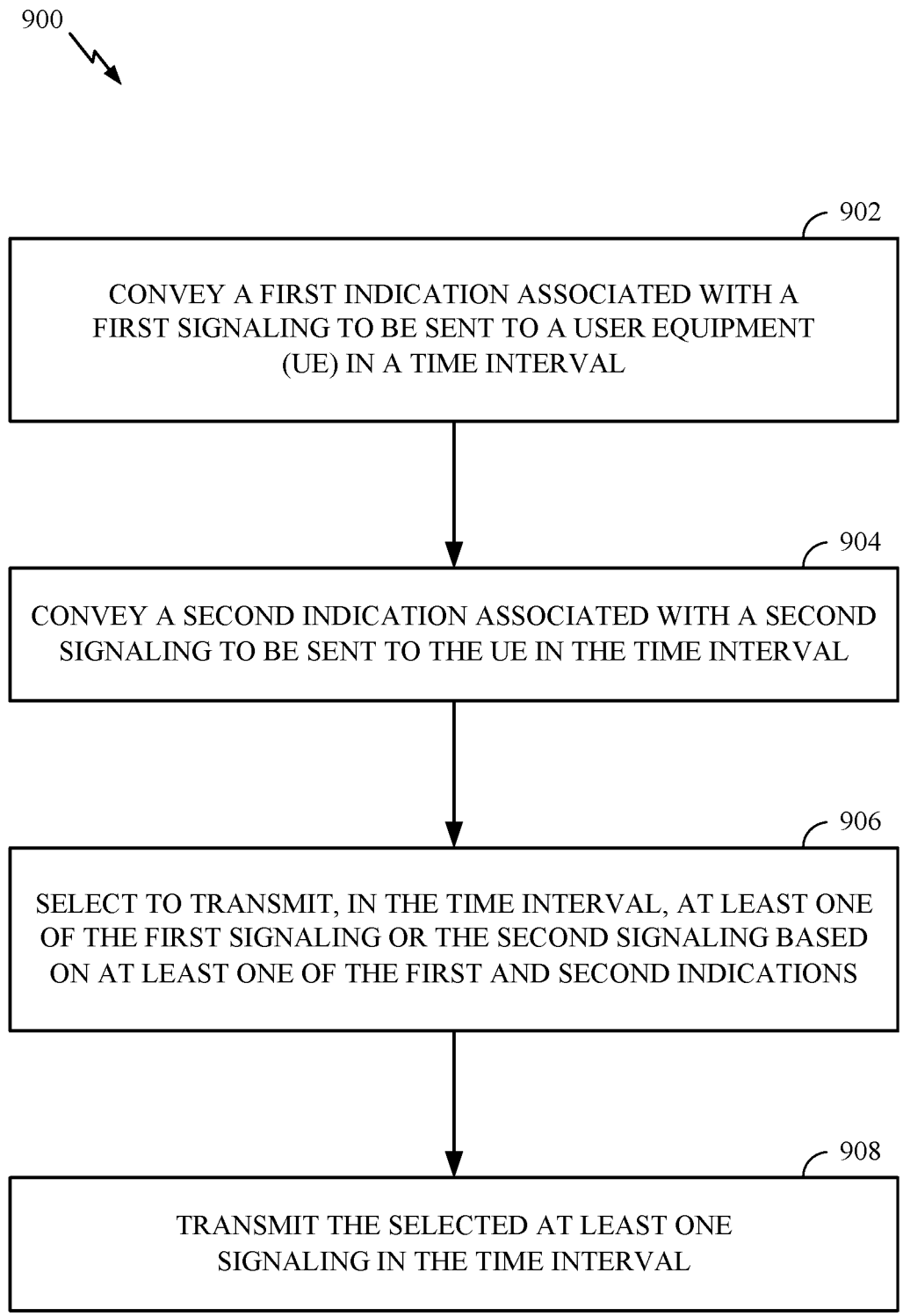
FIG. 9 illustrates example operations performed by a BS, in accordance with certain aspects of the present disclosure.

FIG. 9 illustrates example operations 900 which may be performed by BS, according to aspects of the present disclosure. The BS may include one or more modules of the BS 120 illustrated in FIG. 4. At 902, the BS may convey a first indication associated with a first signaling to be sent to a user equipment (UE) in a time interval. At 904, the BS may convey a second indication associated with a second signaling to be sent to the UE in the time interval. Conveying may refer to transmitting by the BS, communication via preconfigured methods specified by a standard, or a combination thereof.

At 906, the BS may select to transmit, in the time interval, at least one of the first signaling or the second signaling based on at least one of the first or second indications. At 908, the BS may transmit the selected at least one signaling in the time interval.

According to an aspect, the selection of which signaling to transmit may be based, at least in part, on the capability associated with the UE. The capability of the UE indicates if the UE is capable of receiving multiple signals (channels) in a same time interval. The UE may transmit a report indicating its capability. The BS may request such a report from the UE.

According to an aspect, the second indication is transmitted in response to the BS determining there is a low likelihood that the UE will receive the first signaling. Accordingly, the BS may transmit the second indication which may update a configuration (e.g., receiver beam) to use to receive the second signaling. In this manner, the second indication may update or change at least part of the first indication.

According to aspects, the BS may receive, from the UE, an indication of the signaling the UE intends to receive in the future time interval and/or an indication of the signaling the UE received.

FIG. 10 illustrates an example timeline 1000, in accordance with aspects of the present disclosure. As described above, in a wireless system employing beams such as mmW, in addition to using beams for receiving data, a UE may monitor signaling from a serving BS and/or neighboring BSs for beam management and mobility management. The time duration to monitor the signaling may be specified in a standard or specification or may be indicated by a BS ahead of time. A UE may perform beam sweeps in an effort to monitor channels from different directions (for example, to monitor beams 710, 712, and 714 as illustrated in FIG. 7).

According to an example in Slot N, at 1002, a BS may provide an indication to perform a beam sweep to monitor certain channels in a subsequent time interval (e.g., Slot N+K). Thereafter, at 1004, UE may prepare for the beam sweep by loading appropriate codebooks. At 1006, the BS may transmit a second indication, that the UE should receive data (e.g., critical data) with a specific beam in the subsequent time interval (e.g., Slot N+K). In aspects, the time gap between the second indication 1006 and the signaling transmission in Slot N+K is long enough to allow the UE to prepare to receive the critical data in accordance with the indication 1006.

Based on the UE's capability, the UE may not be able to perform both the beam sweep in accordance with indication 1002 and receive the data in accordance with 1006. According to an example, the UE may only have one RF chain or may be configured to monitor one directional beam. According to another example, the UE may only have one additional RF chain available for receiving a directional, beamformed transmission. According to an aspect, due to the UE's configuration, the UE may only be able to receive a transmission from one additional direction. Accordingly, the UE may choose to perform one of the beam sweep or receive the signaling. For example, at 1008, the UE may choose to receive the data signaling only, in accordance with the second indication. The UE may prepare to receive the data signaling by loading the appropriate codebook.

According to an example, based on the UE's capability, the UE may be able to perform both the beam sweep in accordance with 1002 and receive the data in accordance with 1006. At 1008, the UE may perform both tasks using different antenna subarrays and/or RF chains.

At 1010, in Slot N+K, the BS may transmit critical data to the UE. At 1012, the UE may receive the critical data. While not illustrated, after 1012, the UE may transmit an indication of the received critical data to the BS. In this manner, the BS may know that the UE received the critical data and did not perform the beam sweep. Additionally or alternatively, before 1012, the UE may transmit an indication of the signaling it has selected to receive in the time interval.

FIG. 11 illustrates an example timeline 1100, in accordance with aspects of the present disclosure. At 1102, a BS may transmit a first indication to the UE, instructing the UE to perform a beam sweep to monitor certain channel in a later time period (e.g., Slot N+K). According to an example, based on a specification, the UE may determine a scan is scheduled in the later time period. In response to the indication and/or the determination based on the specification, the UE may, at 1104, prepare to perform the beam sweep by loading the appropriate codebook(s).

The BS may determine that certain directions of the beam sweep may not be worth monitoring. For example, the BS may determine there is a low probability the UE will receive signals from one or more of the directions associated with the beam sweep. This determination may be based, at least in part, on a report received from the UE. At 1106, the BS may transmit a second indication instructing the UE to scan only a subset of beams in slot N+K.

At 1108, the UE prepares to receive signaling in accordance with the second indication. For example, the UE loads the codebooks for a beam sweep based on the subset of beams the UE was instructed to monitor. At 1110, the BS or a neighboring BS transmits the signaling for the UE to scan. At 1112, the UE performs a scan to monitor channels in accordance with the second indication. Thus, the UE in FIG. 11 is configured to prioritize the second, later indication 1106 over the first, earlier indication 1102. While not illustrated, the UE may transmit an indication to the BS informing the BS of the monitored directions. While not illustrated, before 1112, the UE may transmit an indication of the signaling it intends to or has selected to receive in the time interval (e.g., in Slot N+K).

Figure 12:
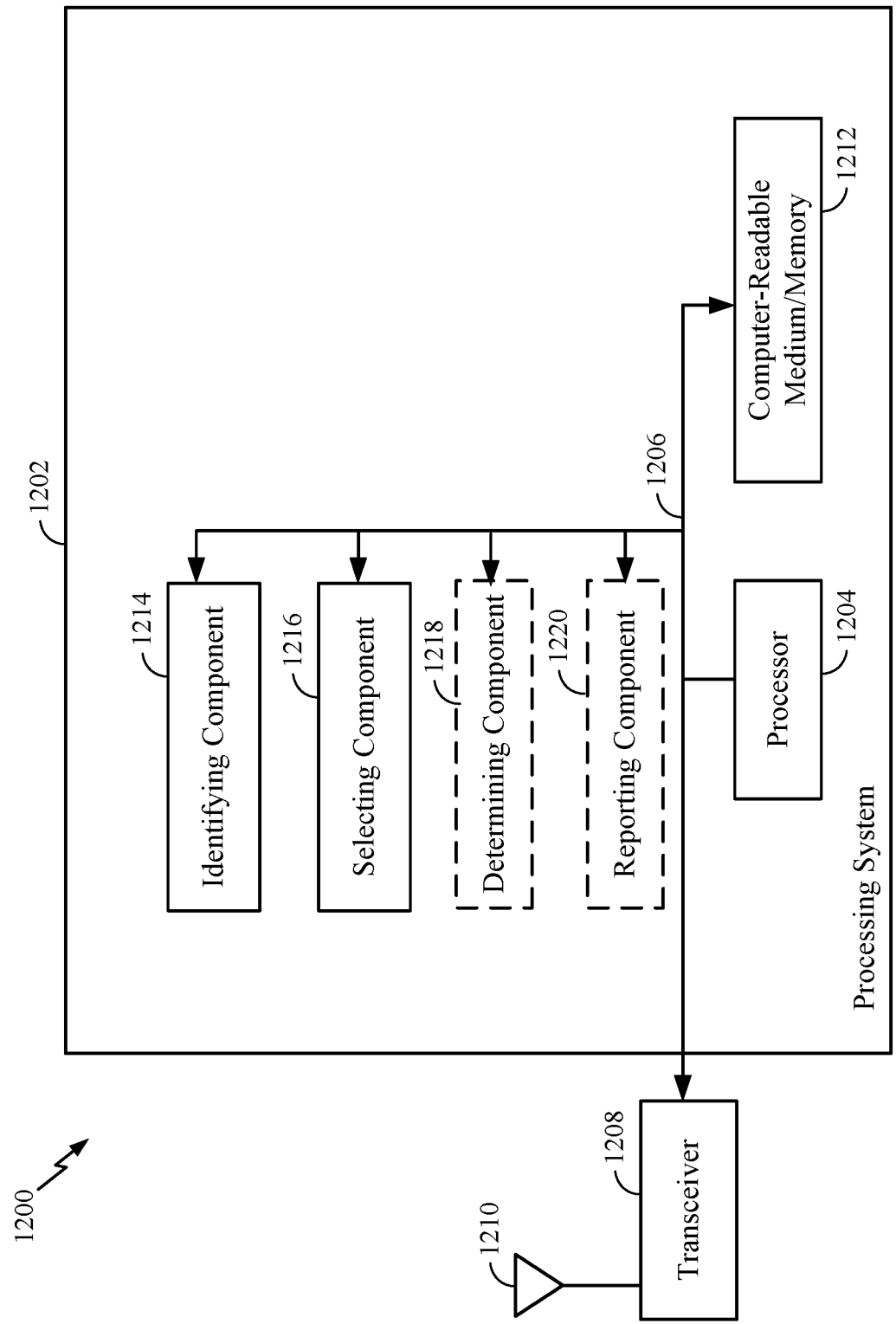
FIG. 12 illustrates a UE that includes various components configured to perform operations for the techniques disclosed herein, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208. The transceiver 1208 is configured to transmit and receive signals for the communications device 1200 via an antenna 1210, such as the various signal described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions that when executed by processor 1204, cause the processor 1204 to perform the operations illustrated in FIG. 8 or other operations for performing the various techniques discussed herein.

In certain aspects, the processing system 1202 further includes one or more of an identifying component 1214, a selecting component 1216, a determining component 1218, and a reporting component 1220 for performing the operations illustrated in FIG. 8 and described herein. The components 1214, 1216, 1218, and 1220 may be coupled to the processor 1204 via bus 1206. The transceiver 1208 may be configured to perform the means for transmitting and/or the means for receiving. In certain aspects, the components 1214, 1216, 1218, and 1220 may be hardware circuits. In certain aspects, the components 1214, 1216, 1218, and 1220 may be software components that are executed and run on processor 1204.

Figure 13:
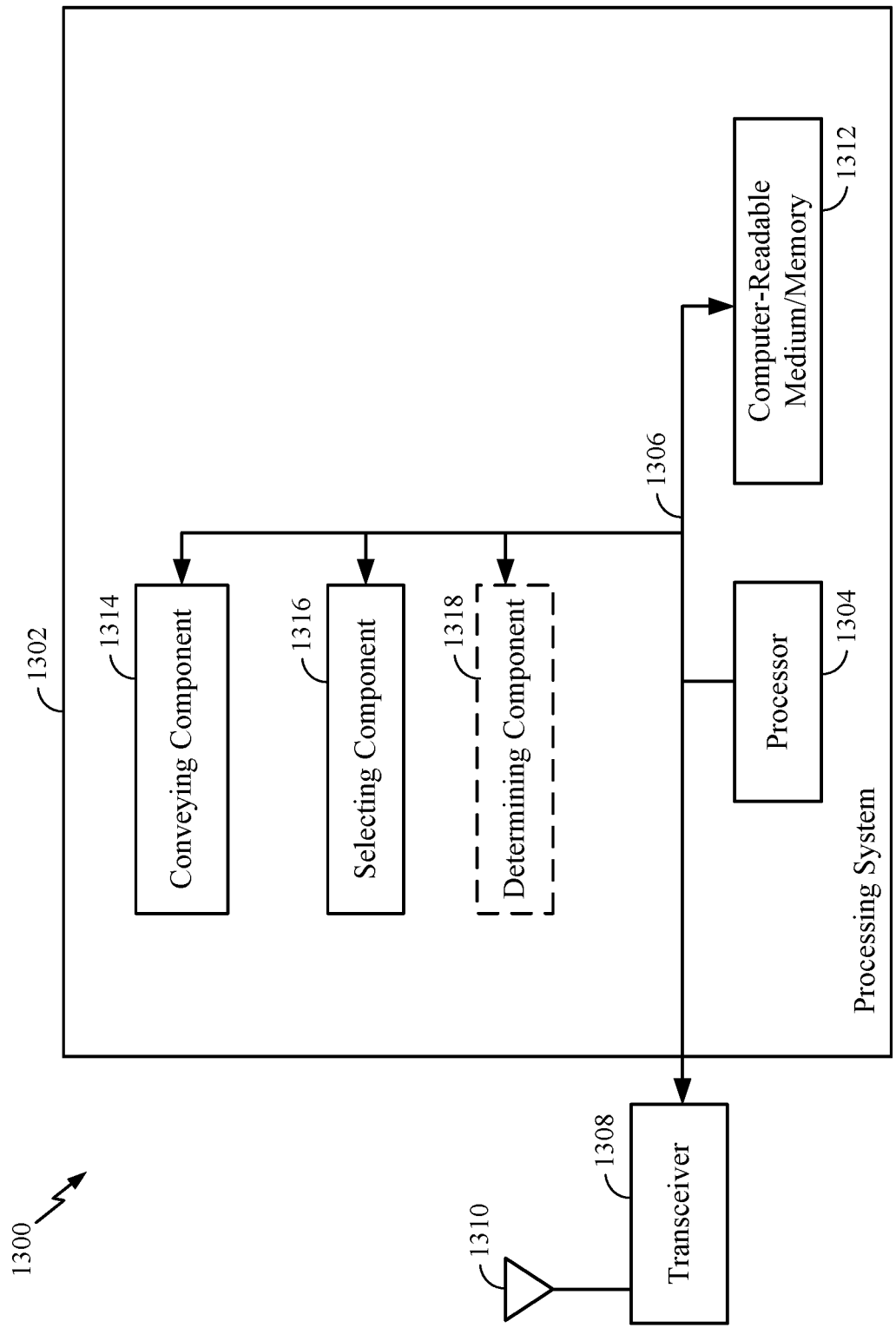
FIG. 13 illustrates a BS that includes various components configured to perform operations for the techniques disclosed herein, in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 9. The communications device 1300 includes a processing system 1302 coupled to a transceiver 1308. The transceiver 1308 is configured to transmit and receive signals for the communications device 1300 via an antenna 1310, such as the various signal described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions that when executed by processor 1304, cause the processor 1304 to perform the operations illustrated in FIG. 9 or other operations for performing the various techniques discussed herein.

In certain aspects, the processing system 1302 further includes one or more of a conveying component 1314, a selecting component 1316, and a determining component 1318 for performing the operations illustrated in FIG. 9 and described herein. The transceiver may perform the means for transmitting and the means for receiving operations. The components 1314, 1316, and 1318 may be coupled to the processor 1304 via bus 1306. In certain aspects, the components 1314, 1316, and 1318 may be hardware circuits. In certain aspects, the components 1314, 1316, and 1318 may be software components that are executed and run on processor 1304.

As described herein, in an NR system, a UE may receive signaling (including data, synchronization signaling, CSI-RS, etc.) using receive beams. Based on a UE's capabilities, the UE may have limitations on the number of receive beams it may monitor at a given time. Therefore, the UE may perform the methods described herein to select which beams to monitor in the given time instance.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 8-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    identifying a first indication associated with a first signaling to be received in a time interval;
    identifying a second indication associated with a second signaling to be received in the time interval;
    selecting to receive, in the time interval, at least one of the first signaling or the second signaling based on at least one of the first or second indications; and
    receiving the selected at least one signaling in the time interval.

2. The method of claim 1, wherein:
    identifying the second indication comprises receiving the second indication, and
    the selecting to receive at least one of the first signaling or the second signaling is based, at least in part, on a time difference between receiving the second indication and the time interval.

3. The method of claim 2, wherein the selecting comprises selecting to receive, at least, the second signaling when the time difference is greater than or equal to a threshold time value.

4. The method of claim 2, wherein the selecting comprises selecting to receive, at least, the first signaling when the time difference is less than a threshold time value.

5. The method of claim 2, wherein the threshold time value is based, at least in part, on one of a capability associated with the UE or predefined by a standard.

6. The method of claim 1, further comprising:
    determining a first receiver beam to receive the first signaling; and
    determining a second receiver beam to receive the second signaling,
    wherein receiving the selected one or more signaling comprises selecting the receiver beam associated with the selected at least one signaling.

7. The method of claim 1, wherein at least one of the first or second indications is identified by at least one of: methods preconfigured in the UE, via signaling from a base station (BS) associated with the indications, or a combination of thereof.

8. The method of claim 1, wherein the first signaling associated with the first indication comprises at least one of: synchronization signaling or channel state information-reference signals (CSI-RS) transmitted from a serving base station (BS) or a neighboring BS.

9. The method of claim 1, further comprising:
reporting, to a base station (BS), a capability of the UE, wherein the capability indicates if UE is configured to receive multiple signals in the time interval.

10. The method of claim 9, further comprising:
receiving, from the BS, a request for the capability of the UE,
wherein the reporting is in response to the request for the capability.

11. The method of claim 1, wherein the second signaling associated with the second indication comprises a data transmission.

12. A method for wireless communication by a base station (BS), comprising:
conveying a first indication associated with a first signaling to be sent to a user equipment (UE) in a time interval;
conveying a second indication associated with a second signaling to be sent to the UE in the time interval;
selecting to transmit, in the time interval, at least one of the first signaling or the second signaling based on at least one of the first or second indications; and
transmitting the selected at least one signaling in the time interval.

13. The method of claim 12, wherein the selecting to transmit is based, at least in part, on a capability of the UE.

14. The method of claim 13, further comprising:
receiving, from the UE, an indication of the capability of the UE, wherein the capability indicates if the UE is configured to receive multiple signals in one time interval.

15. The method of claim 12, wherein:
the second indication is conveyed in a second time interval which precedes the time interval in which the at least one signaling is transmitted by a threshold amount of time.

16. The method of claim 15, wherein the threshold amount of time is identified by at least one of a predefined method and a signaling from a second wireless device.

17. The method of claim 12, wherein at least one of the indications is conveyed by at least one of: methods preconfigured in the BS and the UE, via signaling from the BS associated with the indications, or a combination of thereof.

18. The method of claim 12, further comprising:
determining a low likelihood the first signaling will be received by the UE; and
wherein the second indication is conveyed in response to the determination.

19. The method of claim 12, wherein the first and second signaling comprises at least one of: synchronization signaling or channel state information-reference signals (CSI-RS).

20. The method of claim 12,
wherein the first signaling is associated with a first configuration, and further comprising:
determining an updated configuration for the second signaling, wherein the second indication indicates the updated configuration.

21. An apparatus for wireless communication by a user equipment (UE), comprising:

means for identifying a first indication associated with a first signaling to be received in a time interval;
means for identifying a second indication associated with a second signaling to be received in the time interval;
means for selecting to receive, in the time interval, at least one of the first signaling or the second signaling based on at least one of the first or second indications; and
means for receiving the selected at least one signaling in the time interval.

22. The apparatus of claim 21, wherein:
the means for identifying the second indication comprises means for receiving the second indication, and
the means for selecting to receive at least one of the first signaling or the second signaling is based, at least in part, on a time difference between receiving the second indication and the time interval.

23. The apparatus of claim 22, wherein the means for selecting comprises means for selecting to receive, at least, the second signaling when the time difference is greater than or equal to a threshold time value.

24. The apparatus of claim 22, wherein the means for selecting comprises means for selecting to receive, at least, the first signaling when the time difference is less than a threshold time value.

25. The apparatus of claim 23, wherein the threshold time value is based, at least in part, on one of a capability associated with the UE or predefined by a standard.

26. An apparatus for wireless communication by a base station (BS), comprising:
means for conveying a first indication associated with a first signaling to be sent to a user equipment (UE) in a time interval;
means for conveying a second indication associated with a second signaling to be sent to the UE in the time interval;
means for selecting to transmit, in the time interval, at least one of the first signaling or the second signaling based on at least one of the first or second indications; and
means for transmitting the selected at least one signaling in the time interval.

27. The apparatus of claim 26, wherein the means for selecting to transmit is based, at least in part, on a capability of the UE.

28. The apparatus of claim 27, further comprising:
means for receiving, from the UE, an indication of the capability of the UE, wherein the capability indicates if the UE is configured to receive multiple signals in one time interval.

29. The apparatus of claim 26, wherein:
the means for conveying the second indication comprises means for conveying the second indication in a second time interval which precedes the time interval in which the at least one signaling is transmitted by a threshold amount of time.

30. The apparatus of claim 29, further comprising:
means for receiving the threshold amount of time from the UE.

\* \* \* \* \*